United States Patent
Vinsel et al.

(10) Patent No.: US 10,038,632 B2
(45) Date of Patent: Jul. 31, 2018

(54) AIA ENHANCEMENTS TO SUPPORT L2 CONNECTED NETWORKS

(71) Applicant: VSS Monitoring, Inc., Sunnyvale, CA (US)

(72) Inventors: Peter C. Vinsel, Berkeley, CA (US); Win Naing, Palo Alto, CA (US)

(73) Assignee: NetScout Systems, Inc., Westford, MA (US)

(*) Notice: Subject to any disclaimer, the term of this patent is extended or adjusted under 35 U.S.C. 154(b) by 26 days.

(21) Appl. No.: 14/807,524

(22) Filed: Jul. 23, 2015

(65) Prior Publication Data
US 2017/0026287 A1 Jan. 26, 2017

(51) Int. Cl.
*H04L 12/721* (2013.01)
*H04L 12/751* (2013.01)

(52) U.S. Cl.
CPC .............. *H04L 45/66* (2013.01); *H04L 45/02* (2013.01)

(58) Field of Classification Search
CPC ....... H04L 43/12; H04L 45/02; H04L 45/021; H04L 45/16; H04L 45/54; H04L 45/745; H04L 49/208; H04L 51/18; H04L 67/1095; H04L 12/66; H04L 29/12839; H04L 61/6022
See application file for complete search history.

(56) References Cited

U.S. PATENT DOCUMENTS

| | | | | |
|---|---|---|---|---|
| 6,807,172 B1* | 10/2004 | Levenson | ........... | H04L 49/3009 370/389 |
| 7,002,979 B1* | 2/2006 | Schneider | ........... | H04L 47/2416 370/412 |
| 7,230,935 B2* | 6/2007 | Proctor, Jr. | ........ | H04B 7/15521 370/315 |
| 7,292,573 B2* | 11/2007 | LaVigne | ............... | H04L 43/028 370/390 |
| 7,447,204 B2* | 11/2008 | Narvaez | .................. | H04L 47/10 370/389 |

(Continued)

OTHER PUBLICATIONS

Gigamon, White Paper: Understanding Network TAPs—The First Step to Visibility, May 2015, Gigamon, https://www.gigamon.com/products/technology/network-taps (accessed Feb. 15, 2017).*

(Continued)

*Primary Examiner* — Eric Nowlin
(74) *Attorney, Agent, or Firm* — Locke Lord LLP; Scott D. Wofsy; Christopher J. Capelli

(57) ABSTRACT

A method for determining a routing for packets aggregated from multiple Layer 2 (L2) networks is provided. An ingress packet is received from an ingress inline network port and is processed to extract a source Media Access Control (MAC) address and a port identifier associated with the source MAC address. The extracted source MAC address of the ingress packet is looked up in a MAC address table. The ingress packet is forwarded to an inline tool device. When an egress packet is received back from the inline tool device it is processed to extract source and destination MAC addresses. The extracted source and destination MAC addresses of the egress packet are looked up in the MAC address table. The egress packet is transmitted to an egress inline port based on the looked up destination MAC address.

20 Claims, 6 Drawing Sheets

(56) References Cited

U.S. PATENT DOCUMENTS

| | | | |
|---|---|---|---|
| 7,469,298 B2* | 12/2008 | Kitada | H04L 12/4645 709/223 |
| 7,558,273 B1* | 7/2009 | Grosser, Jr. | H04L 12/4645 370/389 |
| 7,580,409 B1* | 8/2009 | Swenson | H04L 49/253 370/392 |
| 7,599,353 B2* | 10/2009 | Kim | H04L 49/351 370/352 |
| 7,660,259 B1* | 2/2010 | Grosser | H04L 45/00 370/252 |
| 7,697,527 B2* | 4/2010 | Figueira | H04L 49/602 370/389 |
| 7,933,268 B1* | 4/2011 | Melman | H04L 12/18 370/245 |
| 8,087,064 B1* | 12/2011 | Baum | H04L 12/4633 705/73 |
| 8,228,916 B2* | 7/2012 | Figueira | H04L 49/602 370/389 |
| 8,274,980 B2* | 9/2012 | Sato | H04L 12/413 370/392 |
| 8,320,384 B2* | 11/2012 | Oouchi | H04L 12/66 370/395.31 |
| 8,693,475 B2* | 4/2014 | Kompella | H04L 12/4633 370/392 |
| 8,780,899 B2* | 7/2014 | Tillman | H04L 12/66 370/389 |
| 8,811,409 B2* | 8/2014 | Allan | H04L 12/4662 370/338 |
| 8,958,425 B2* | 2/2015 | Kompella | H04L 12/4633 370/392 |
| 9,019,963 B2* | 4/2015 | Figueira | H04L 49/602 370/392 |
| 9,185,035 B2* | 11/2015 | Ra | H04L 45/745 |
| 9,276,897 B2* | 3/2016 | Zhang | H04L 47/12 |
| 9,319,335 B1* | 4/2016 | Tripathi | H04L 12/4641 |
| 9,369,426 B2* | 6/2016 | Koponen | H04L 47/12 |
| 9,397,912 B2* | 7/2016 | Rusak | H04L 43/0811 |
| 9,413,649 B2* | 8/2016 | Subramanian | H04L 45/586 |
| 9,544,219 B2* | 1/2017 | Chong | H04L 45/02 |
| 9,584,397 B2* | 2/2017 | Ghanwani | H04L 45/48 |
| 2003/0037163 A1* | 2/2003 | Kitada | H04L 12/4645 709/236 |
| 2005/0002390 A1* | 1/2005 | Kim | H04L 49/45 370/389 |
| 2005/0220092 A1* | 10/2005 | LaVigne | H04L 43/028 370/389 |
| 2005/0232254 A1* | 10/2005 | Korner | H04L 12/4641 370/360 |
| 2006/0203818 A1* | 9/2006 | Chen | H04L 45/16 370/390 |
| 2007/0171908 A1* | 7/2007 | Tillman | H04L 12/66 370/389 |
| 2008/0159167 A1* | 7/2008 | Ito | H04L 12/2602 370/252 |
| 2008/0240106 A1* | 10/2008 | Schlenk | H04L 12/4625 370/392 |
| 2009/0296713 A1* | 12/2009 | Kompella | H04L 12/4633 370/392 |
| 2010/0002702 A1* | 1/2010 | Saito | H04L 45/18 370/392 |
| 2010/0215045 A1* | 8/2010 | Figueira | H04L 61/2015 370/392 |
| 2011/0032825 A1* | 2/2011 | Minkenberg | H04L 45/66 370/238 |
| 2012/0155473 A1* | 6/2012 | Figueira | H04L 61/2015 370/392 |
| 2012/0213223 A1* | 8/2012 | Ortacdag | H04L 49/201 370/390 |
| 2013/0148541 A1* | 6/2013 | Zhang | H04L 47/12 370/254 |
| 2013/0148542 A1* | 6/2013 | Zhang | H04L 47/12 370/254 |
| 2013/0287027 A1* | 10/2013 | Ra | H04L 45/745 370/392 |
| 2013/0322453 A1* | 12/2013 | Allan | H04L 12/4662 370/395.53 |
| 2014/0068088 A1* | 3/2014 | Krishnan | H04L 61/2038 709/227 |
| 2014/0169220 A1* | 6/2014 | Kompella | H04L 12/4633 370/254 |
| 2014/0233429 A1* | 8/2014 | Farkas | H04L 45/306 370/255 |
| 2014/0269380 A1* | 9/2014 | Rusak | H04L 43/0811 370/252 |
| 2015/0016460 A1* | 1/2015 | Zhang | H04L 45/38 370/392 |
| 2015/0046507 A1* | 2/2015 | Saxena | H04L 67/10 709/201 |
| 2016/0094459 A1* | 3/2016 | Yasuda | H04L 49/60 370/401 |
| 2016/0142260 A1* | 5/2016 | Cafarelli | H04L 41/12 370/250 |
| 2016/0142304 A1* | 5/2016 | Alawani | H04L 43/12 370/389 |
| 2016/0142305 A1* | 5/2016 | Alawani | H04L 45/74 370/389 |
| 2016/0277254 A1* | 9/2016 | Tripathi | H04L 12/4641 |
| 2016/0294659 A1* | 10/2016 | Rusak | H04L 43/0811 |
| 2016/0301608 A1* | 10/2016 | Natarajan | H04L 45/7453 |
| 2016/0315878 A1* | 10/2016 | Sufleta | H04L 49/25 |
| 2017/0091258 A1* | 3/2017 | Rajahalme | H04L 29/06 |
| 2017/0207997 A1* | 7/2017 | Martin | H04L 41/0896 |
| 2017/0237655 A1* | 8/2017 | Yang | H04L 45/38 370/254 |
| 2018/0123828 A1* | 5/2018 | Zhang | H04L 12/4633 |

OTHER PUBLICATIONS

Gigamon, TAP vs SPAN Infographic, Jun. 2016, Gigamon, https://www.gigamon.com/products/technology/network-taps (accessed Feb. 15, 2017).*

* cited by examiner

| MAC ADDRESS | PORT | MRSB |
|---|---|---|
| MAC-PRI | 1 | 1 |
| MAC-SEC | 3 | 1 |
| MAC-HSRP | 1 | 1 |
| | | |

| MAC ADDRESS | PORT | MRSB |
|---|---|---|
| MAC-LAPT | 2 | 1 |
| MAC-LAPT | 4 | 1 |
| | | |
| | | |

FIG. 4

AIA ENHANCEMENTS TO SUPPORT L2 CONNECTED NETWORKS

FIELD OF THE INVENTION

The present invention relates generally to computer networks and, more particularly, to supporting multiple aggregated networks with L2 connections between them.

BACKGROUND OF THE INVENTION

Communication networks are important for providing data and voice communication. Monitoring networks is important to ensure reliable operation, fault detection, timely mitigation of potentially malicious activities, and more. Network taps are generally known in the art for connecting to networks and providing a port to monitor the communication traffic on the network.

In packet switched communication systems, a router is a switching device that receives packets containing data or control information on one port, and based on destination information contained within the packet, routes the packet out another port to a destination (or an intermediary destination). Conventional routers perform this switching function by evaluating header information contained within a first data block in the packet. The header includes destination information that can be used in determining the proper output port for a particular packet. Efficient switching of packets through the router is of paramount concern.

SUMMARY OF THE INVENTION

The purpose and advantages of the illustrated embodiments will be set forth in and apparent from the description that follows. Additional advantages of the illustrated embodiments will be realized and attained by the devices, systems and methods particularly pointed out in the written description and claims hereof, as well as from the appended drawings.

In accordance with a purpose of the illustrated embodiments, in one aspect, a method for determining a routing for packets aggregated from multiple Layer 2 (L2) networks is provided. An ingress packet is received from an ingress inline network port and is processed to extract a source Media Access Control (MAC) address and a port identifier associated with the source MAC address. The extracted source MAC address of the ingress packet is looked up in a MAC address table. The ingress packet is forwarded to an inline tool device. When an egress packet is received back from the inline tool device it is processed to extract source and destination MAC addresses. The extracted source and destination MAC addresses of the egress packet are looked up in the MAC address table. The egress packet is transmitted to an egress inline port based on the looked up destination MAC address.

In another aspect, a communication system which includes a plurality of networks having an L2 connection between two or more of the plurality of networks is provided. The system also includes one or more inline tool devices configured to monitor and analyze a flow of network traffic. The system further includes an AIA device connected to each of the plurality of networks and connected to the one or more inline tool devices. The AIA device stores therein a plurality of programming instructions, which when executed on the AIA device cause the AIA device to receive an ingress packet from an ingress inline network port and to extract a source Media Access Control (MAC) address and a port identifier associated with the source MAC address. The plurality of program instructions further includes program instructions which cause the AIA device to look up the extracted source MAC address of the ingress packet in a MAC address table and cause the AIA device to forward the ingress packet to the one or more inline tool devices. The plurality of program instructions further includes program instructions which cause the AIA device to process an egress packet received from the one or more inline tool devices to extract source and destination MAC addresses. The plurality of program instructions also includes program instructions which cause the AIA device to look up the extracted source and destination MAC addresses of the egress packet in the MAC address table. Additionally, the plurality of program instructions includes program instructions which cause the AIA device to transmit the egress packet to an egress inline port connected to the one of the plurality of networks based on the looked up destination MAC address information.

BRIEF DESCRIPTION OF THE DRAWINGS

The accompanying appendices and/or drawings illustrate various, non-limiting, examples, inventive aspects in accordance with the present disclosure:

FIG. 4 illustrates exemplary MAC address lookup tables used by an AIA device in the communication system of FIG. 3, according to one embodiment of the invention described herein;

DETAILED DESCRIPTION OF CERTAIN EMBODIMENTS

Figure 1:
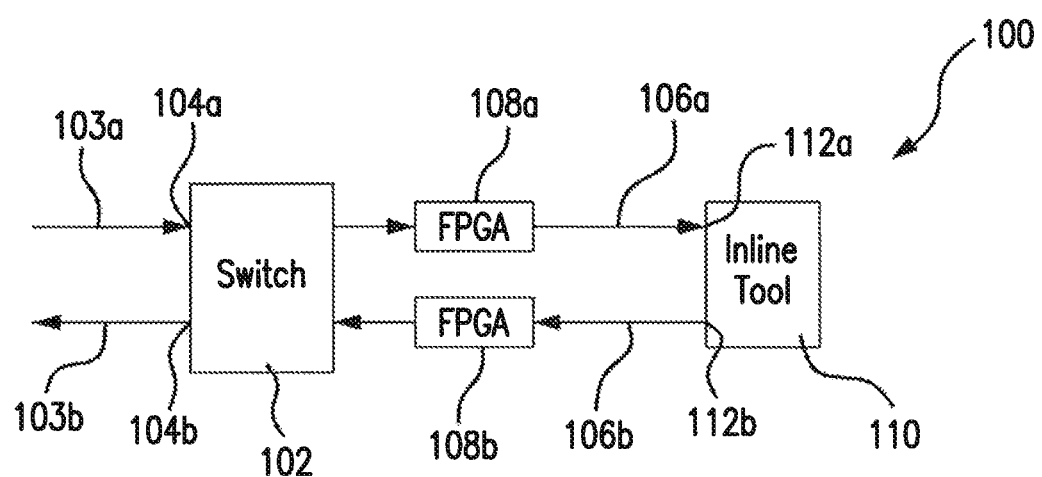
FIG. 1 is a block diagram illustrating internal network configuration able to route traffic flows between a network switch and an inline processing tool by translating user specified identifiers to internal identifiers, in accordance with an embodiment of the present invention.

The present invention is now described more fully with reference to the accompanying drawings, in which an illustrated embodiment of the present invention is shown. The present invention is not limited in any way to the illustrated embodiment as the illustrated embodiment described below is merely exemplary of the invention, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the present invention. Furthermore, the terms and phrases used herein are not intended to be limiting but rather to provide an understandable description of the invention. For example, reference is made to Ethernet Protocol but other protocols can be used in the invention. The embodiments of the invention are applicable to both wire and optical technologies.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, exemplary methods and materials are now described. It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the embodiments of this invention as discussed below are preferably a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described below.

As used herein, the term "ingress" refers to the arrivals direction in which packets are processed; while the term "egress" refers to the departure direction in which packets are processed. For example, an ingress port typically refers to the port on which a packet is received by a packet switching device, and an egress port typically refers to the port from which a packet will exit a packet switching device.

Turning now descriptively to the drawings, in which similar reference characters denote similar elements throughout the several views, FIG. 1 is a block diagram illustrating internal network configuration of a network monitoring system able to route traffic flows between a network switch and an inline processing tool by translating user specified identifiers to internal identifiers, in accordance with an embodiment of the present invention. The network monitoring system 100 illustrated in FIG. 1 includes a network switch 102. As one of ordinary skill in the art will appreciate, each network device in system 100 can be physically associated with a port of a switch to which it is connected. Data packets pass through the network. Data frames, or packets, can be transferred between network devices by means of a switch's logic link control (LLC)/media access control (MAC) circuitry, or "engines", associated with ports on a network device, e.g., switch 102. The network switch 102 forwards data frames received from a transmitting network device to a destination network device based on the header information in received data packets. The switch 102 can also forward packets from a given network to other networks through ports on one or more other switches.

Network monitoring systems typically analyze frames or packets of data as they pass through a network. The medium on which the data is carried is typically optical fiber or copper cable. The network monitor requires access to this medium in order to obtain visibility of the data passing through it. This requires the network monitor to be placed either in-line with the network link or on the span port output of a network switch or router. In FIG. 1 there is shown the connection of the network monitor 110 to the first bypass port 104a of the network switch 102. The method of gaining access to data on the network link is commonly referred to as "tapping".

In-line tapping may be achieved using passive or active tapping methods. Both of these methods require that the insertion into the network be unobtrusive so as not to affect the transmission of data between the devices on the network. An active tap re-drives the network data passing though it 106a such that the ongoing signal passed back to the network 106b is not degraded. A passive tap does not provide for any regeneration of the signal.

Thus, active tapping is achieved in the configuration illustrated in FIG. 1 using port-bypass features of the switch 102 in the front-end portion of the network monitor 110. It is noted that in various embodiments, network monitor 110, referred to hereinafter as inline tool, may comprise any inline data processing device including, without limitation, any suitable inline network device configured to manage network access, perform load balancing and/or configured to provide high availability/fail-over of in-line network devices (e.g., intrusion prevention systems, proxy servers, and WAN accelerators). It is noted inline tool 110 receives data from network link 103a through a first bypass monitor port 112a, makes the copy of the data for subsequent processing and loops the data back to the opposite channel 106b connected to a second bypass monitor port 112b of the inline tool 110, which re-drives the data back onto the network link 103b through the second bypass port 104b of the network switch 102.

In one embodiment of the present invention, the network switch 102 comprises a VLAN enabled switch. A virtual local area network (LAN) or "VLAN" is a logical subdivision of a Layer 2 network that makes a single Layer 2 infrastructure operate as though it were multiple, separate Layer 2 networks. This is accomplished by adding a numeric tag field (e.g., a VLAN tag) to each data packet as it leaves a Layer 2 switch which identifies the VLAN number to which the packet belongs. Other VLAN-enabled switches honor the VLAN numbering scheme to segregate the network into logical, virtual networks.

The customer specific VLAN tag is generally appended to VLAN traffic in the customer network using an identifier selected from a particular VLAN space comprising a set of VLAN identifier (VID) values. To differentiate the traffic of the various customers, the service provider generally assigns each customer a set of one or more unique VID values.

In some embodiments of the present invention, the monitoring system 100 may include network packet brokers described below (shown in FIG. 3). To maintain transparency, it is highly desirable for the monitoring system 100 to preserve the identity of the source network for each received packet. It is noted that some network packet brokers add different internal VLAN tags in each direction 106a and 106b when processing packets, as discussed below. To address this issue, the configuration illustrated in FIG. 1 includes Field Programmable Gate Array (FPGA) devices 108a and 108b that handle removal of customer specific identification information (e.g., internal VLAN tags) from ingress packets and reinserting the VLAN tags back on to egress packets.

Figure 2:
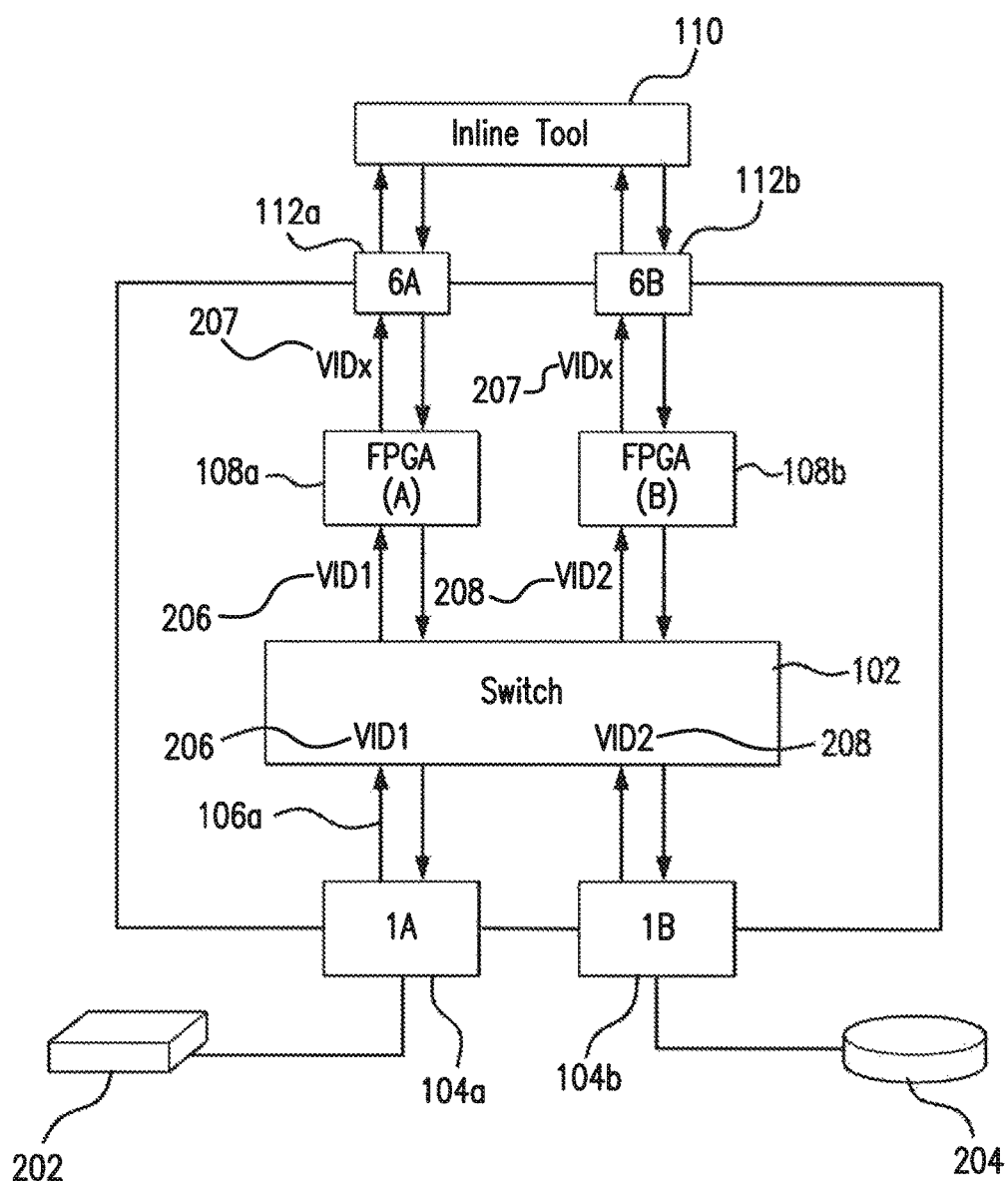
FIG. 2 is an expended block diagram illustrating internal network configuration able to route traffic flows between a network switch and an inline processing tool by translating user specified identifiers to internal identifiers, in accordance with an embodiment of the present invention.

FIG. 2 is an expended block diagram illustrating internal network configuration of a network monitoring system able to route traffic flows between a network switch and an inline processing tool by translating user specified identifiers to internal identifiers, in accordance with an embodiment of the present invention. Generally, carrier Internet Protocol (IP) networks are organized in tiers, where the lower tiers include edge routers 202, 204 that connect to larger core routers (not shown in FIG. 2). The edge routers 202, 204 perform numerous IP protocol functions, whereas the core routers are mostly called upon to forward traffic from one edge router 202, 204 to another. The edge routers 202, 204 are directly connected to the switch 102 having a pair of network bypass ports 104a and 104b. According to an embodiment of the present invention, the switch 102 adds a VID tag 206, 208 to each packet as it leaves the switch 102. As shown in FIG. 2, the switch 102 assigns different tags to the traffic flowing through different ports. However, to keep transparency of the active tapping both ingress and egress ports of a given communication session must have same VID.

According to an embodiment of the present invention, FPGA programmable devices 108a and 108b connected to a pair of bypass monitoring ports 112a and 112b, respectively, of inline tool 110 are programmed to translate internal (switch assigned) VIDs, such as VID1 206 and VID2 208 to a customer specified VID, such as VIDx 207. In this mode of operation FPGA devices 108a and 108b remove VLAN tags from each packet prior to sending it to the inline processing tool 110 via a corresponding bypass monitor port 112a and 112b. In reverse direction, the VLAN tag is inserted back at the beginning of the packet by the FPGA devices 108a and 108b. It is noted that in order to add a proper VLAN tag on the way out of the inline processing tool 110, the FPGA devices 108a and 108b may utilize a MAC learning function described in greater detail below.

Figure 3:
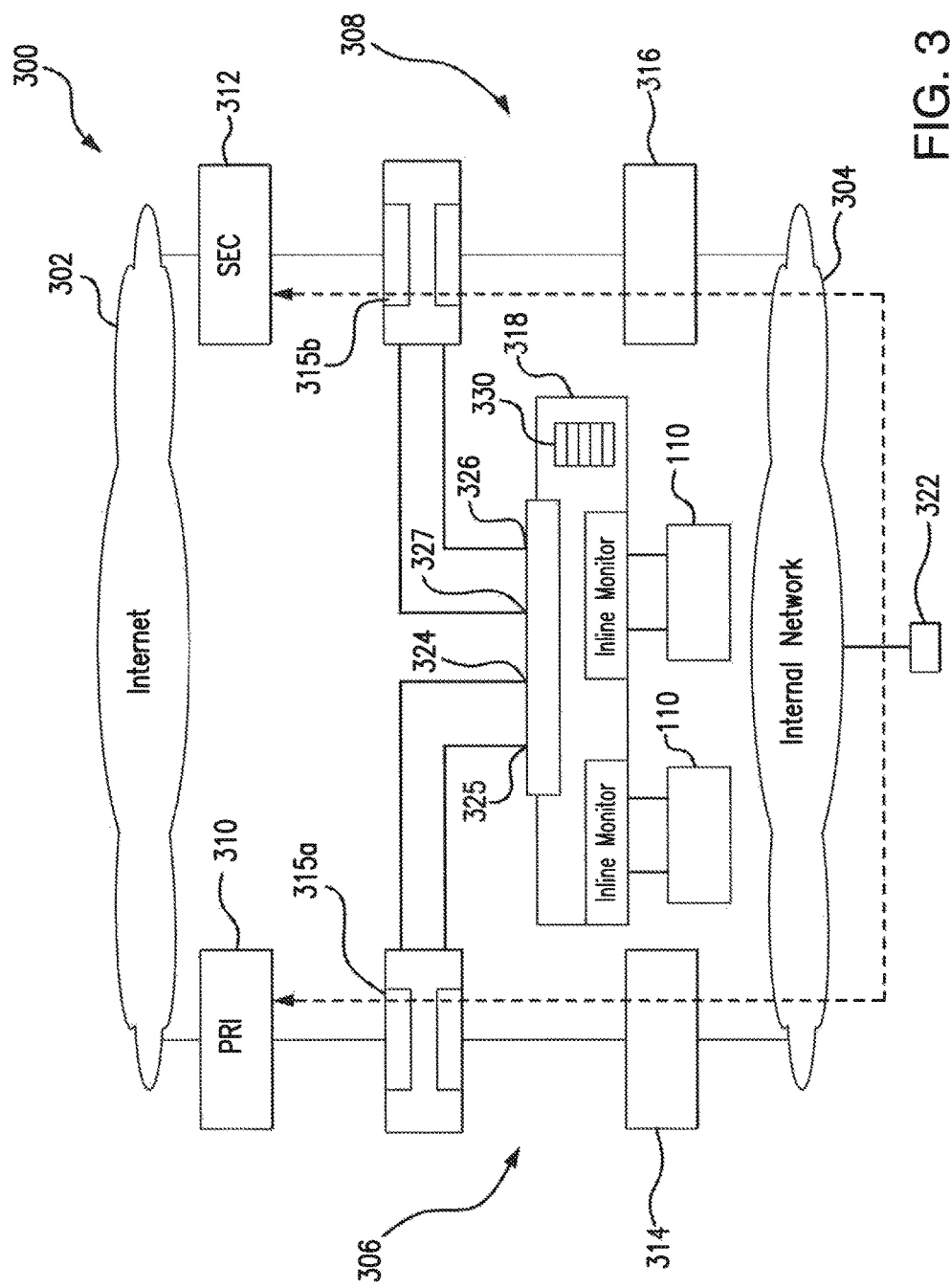
FIG. 3 is a block diagram illustrating a communication system which includes a plurality of networks having an L2 connection between them, according to one embodiment of the invention.

FIG. 3 is a block diagram illustrating a communication system which includes a plurality of networks having an L2 connection between them. The exemplary network topology of the communication system 300 includes a plurality of networks such as a primary network 306, secondary network 308, internal network 304 and Internet 302. In the illustrated example, the primary network 306 is coupled to the Internet 302 via first gateway that comprises a first router 310, while the second network 308 is coupled to the Internet 302 via a second gateway that comprises a second router 312. In one embodiment, routers 310 and 312 comprise redundant routers employing a redundant routing protocol (such as Hot Standby Router Protocol (HSRP), although the principles described herein are also applicable to other redundant routing protocols such as Virtual Router Redundancy Protocol (VRRP)). By redundant routers is meant a gateway that employs multiple routers for routing packets. A protocol associated with the redundant routers controls the operation of the redundant routers. All routers share a "virtual IP" address, so they are all seen as one address. VRRP can also be used for load sharing. As those skilled in the art can readily appreciate, the principles described herein are not specific to any one or more redundant router protocols, such as HSRP and/or VRRP, but can be employed with any suitable router protocol.

In addition, both primary network 306 and secondary network 308 are connected to the internal network 304 via switches 314 and 316, respectively. In one embodiment, the internal network 304 comprises a Virtual Private Network (VPN) over a layer 2 (L2) infrastructure. In other words, internal network 304 provides the required L2 connectivity across an IP transport to a plurality of network devices such as laptop 322. Accordingly, the switches 314 and 316 comprise L2 networking devices. Furthermore, both primary network 306 and secondary network 308 may include one or more network packet broker devices 315a and 315b, respectively. The network packet brokers 315 (collectively) filter network traffic from port mirrors, network TAPs, and probes. For example, inline tools (i.e., network security and performance tools) 110 may only support 2 GBps of traffic, and the network packet brokers 315a and 315b can be manually configured to filter and shape traffic from a 8 GBps link to conform to the constraint of the network security and performance tools 110. In the illustrated example, the network packet brokers 315a serve the filtered network traffic to an advanced inline aggregation device 318. In one embodiment, the advanced inline aggregation (AIA) device 318 comprises a TAP (Test Access Point) which is an active splitting mechanism installed between the one or more inline tools 110 and the corresponding networks 306, 308.

AIA device 318 transmits both the send and receive data streams simultaneously on separate dedicated channels, ensuring all data arrives at the network security and performance tools 110 in real time. According to an embodiment of the present invention, the AIA device 318 includes a MAC address table storage 330, hardware logic programmed to perform various packet processing operations (including steps described in conjunction with FIGS. 5 and 6 below), and multiple ports 324-327. In several embodiments, such hardware logic comprises programmable logic components (e.g. FPGA, or complex programmable logic device (CPLD)). In another embodiment, AIA device's 318 logic is implemented using any number of discrete logic components. In yet another embodiment, AIA device processing circuitry 318 is implemented using an application specific integrated circuit (ASIC). It is appreciated that the communication system 300 can include any number of physical switches 314, 316, physical or virtual routers 310, 312, physical network packet brokers 315, and other physical or virtual network elements, without deviating from the present disclosure.

It is noted that when the AIA device 318 aggregates multiple inline network port pairs into a tool (or tool chain), it's important for the AIA device 318 to know if there are L2 connections between adjacent ports. Since the AIA device 318 aggregates the traffic before sending it to the inline tools 110, it should also be able to split out the reversed traffic received back from the inline tools 110. In one embodiment of the present invention, network packet broker devices 315a and 315b may be configured to add VIDs to the network traffic, wherein each VID uniquely identifies the ingress network port the packet was originally received from and that VID tag can be used to send the packet to the correct associated egress network port (from the A/B port pair, for example) when the packet is received back from the tools 110 by the network packet broker devices 315a and 315b. This feature enables the inline tools 110 to not only know what port pair the packet came from but which direction the packet is going (from port A to port B or from B to A in a port pair). Such feature allows a single port inline tool 110 to function properly by using packet VIDs to distinguish all traffic. However, this use of VIDs is not compatible with the 802.1Q protocol which requires having a single VID for both transit directions of a logical VLAN traffic.

It is further noted that at least some inline tools 110 may not support any VLAN tags at all. Thus, in various embodiments of the present invention, the AIA device 318 may be configured to utilize a source MAC address learning function described in greater detail below that enables the AIA device 318 to forward network traffic to the proper network segment when the AIA device 318 receives packets from the inline tools 110. However, there are some conditions that impact proper operation of the aforementioned source MAC address learning function. For example, when multiple network segments have L2 connections across inline network port pairs 324-327 as shown in FIG. 3 at least some source MAC addresses may appear across multiple inline networks. More specifically, conventional MAC address learning function implemented in the AIA devices 318 effectively acts as a L2 source address forwarding function by learning the source MAC addresses (and associated network port pair) of ingress packets received from the network ports 324-327 before sending the packets to the inline tools 110. When the AIA device 318 receives a corresponding egress packet from the inline tool 110, the egress packet is forwarded to the proper network port pair by searching for the source MAC address in an internal MAC address table 402 shown in FIG. 4 and described below. According to various embodiments of the present invention, the AIA device 318 invokes the MAC address learning function when processing packets in both directions of packet travel on aggregated network port pairs.

Referring back to FIG. 3, both switches 314 and 316 are L2 switches at the edge of the L2 internal network 304. This means that multicast packets from any device on the internal network 304, such as packets sent by exemplary laptop 322, may show up on multiple inline network ports of the AIA device 318. For example, when the first router 310 sends a multicast packet or a unicast packet to the second router 312, the AIA device 318 receives the packet first on a second port 324 from the first network packet broker device 315a. Once the packet passes through the inline tools 110 it will return back to the AIA device 318. Next, the AIA device 318 transmits the packet via its first port 325 back to the first network 306 via the first network packet broker 315a. However, it is noted that the L2 switching mechanism in the internal network 304 transmits the packet to the second network 308. Thus, effectively the same packet shows up back to the fourth port 326 of the AIA device 318 via the second network packet broker device 315b. This second appearance of the same packet leads to confusion of the aforementioned conventional MAC address learning function since this function does not support L2 connected networks and may effectively cause packet flooding. Various embodiments of the present invention described below provide enhanced MAC address learning function that supports multiple aggregated networks with L2 connections between them without flooding L2 traffic.

Figure 5:
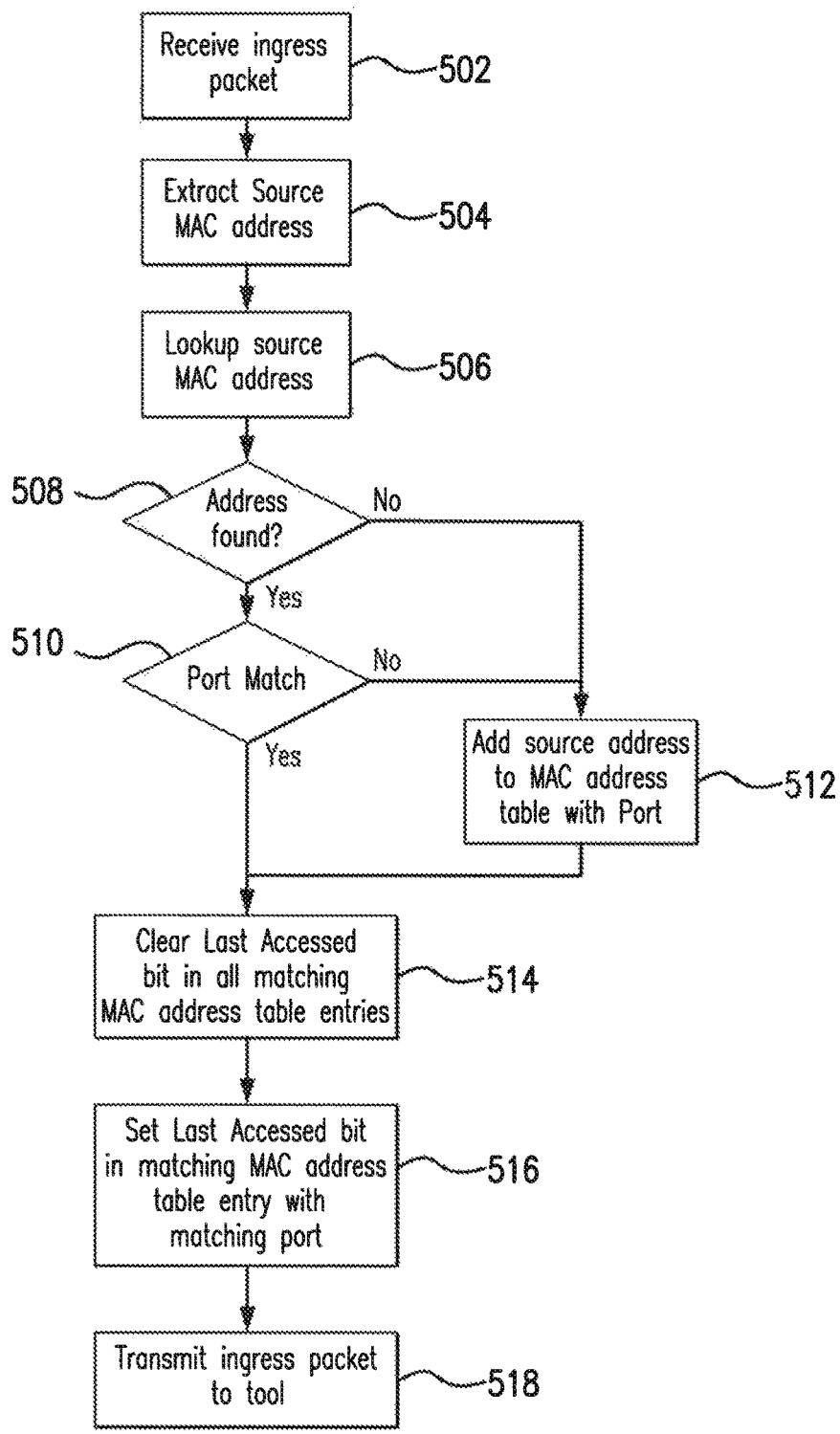
FIG. 5 is a flowchart illustrating exemplary steps performed by the AIA device of FIG. 3 for processing ingress packets, in accordance with an embodiment of the present invention.
Figure 6:
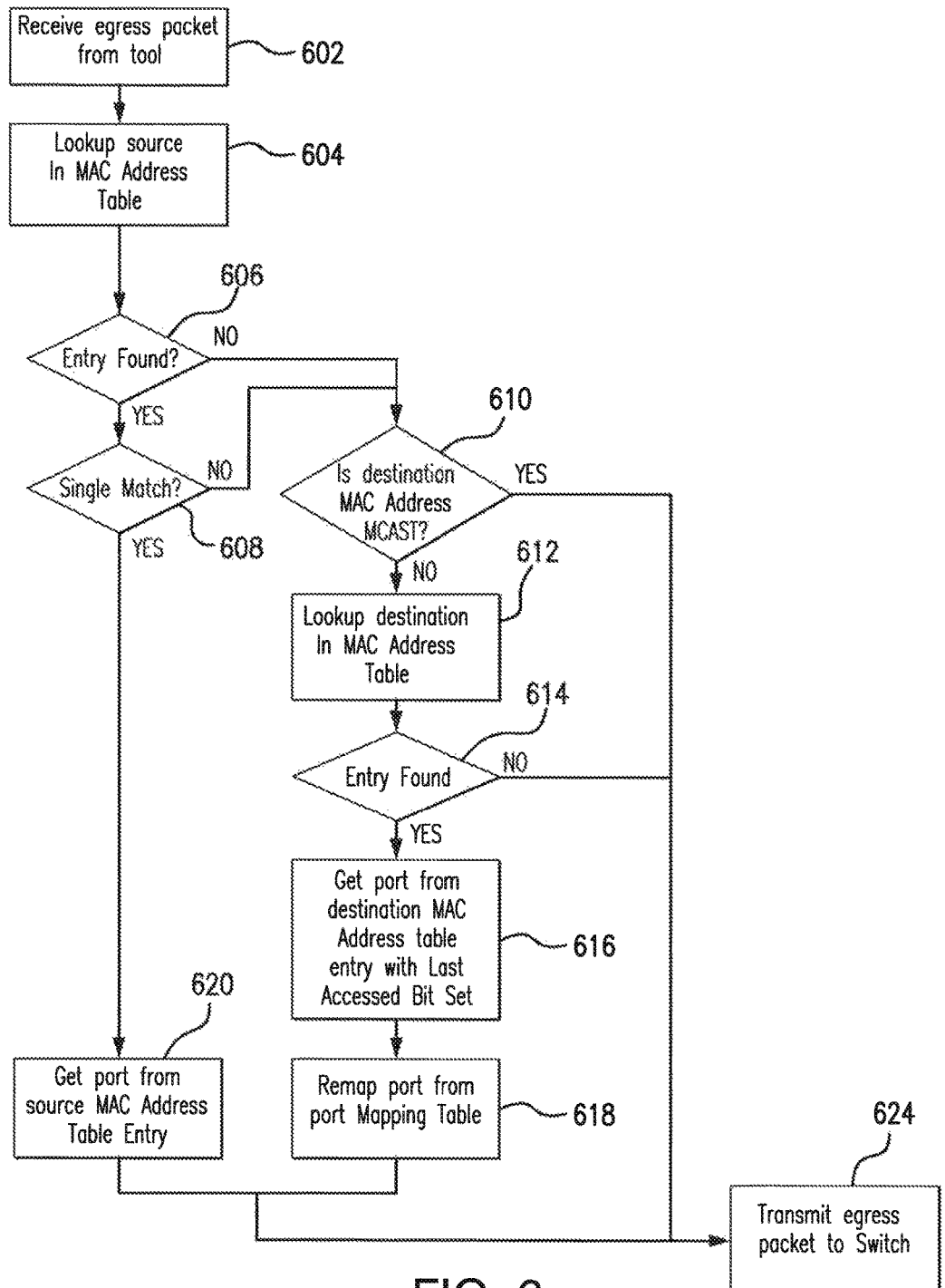
FIG. 6 is a flowchart illustrating exemplary steps performed by the AIA device of FIG. 3 for processing egress packets, in accordance with an embodiment of the present invention.

FIGS. 5 and 6 are flowcharts illustrating exemplary steps for processing ingress and egress packets by the AIA device 318 of FIG. 3 using an enhanced MAC address learning function, in accordance with an embodiment of the present invention. Before turning to descriptions of FIGS. 5 and 6, it is noted that the flow diagrams in FIGS. 5 and 6 show examples in which operational steps are carried out in a particular order, as indicated by the lines connecting the blocks, but the various steps shown in these diagrams can be performed in any order, or in any combination or sub-combination. It should be appreciated that in some embodiments some of the steps described below may be combined into a single step. In some embodiments, one or more steps may be omitted. In some embodiments, one or more additional steps may be performed.

In step 502, the AIA device 318 receives an ingress packet stream from the inline port of the first network packet broker device 315a, for example. In this case, the first network packet broker device 315a acts as a switching device. In step 504, the AIA device 318 processes the received ingress packet stream by evaluating layer 2 header fields of all received packets. As noted above, the first network packet broker 315a typically adds to each packet header information (i.e., internal VID) uniquely identifying the network port the packet was originally received from. In step 504, the AIA device 318 extracts the source MAC address and the received input port information from the received packet header.

The MAC address table storage 330 (shown in FIG. 3) is constructed by a conventional on chip local memory. The MAC address table storage 330 stores MAC address tables 402a and 402b (shown in FIG. 4) therein. According to an embodiment of the present invention, to support L2 connected networks the AIA device 318 maintains two different MAC address tables 402a and 402b for each side of the inline network port pairs. It is noted that the AIA device determines which of the MAC address tables 402a and 402b to use based on which switch side port the packet was originally received from. As shown in FIG. 4, a mapping of MAC addresses 404 to one of the multiple ports 406 is registered in each of the MAC address tables 402a and 402b. In the illustrated example, the registry in the first MAC address table 402a represents a mapping of a MAC address MAC-PRI of the first router 310 to the first port 325 connecting the AIA device 318 with the first router 310 through the first broker device 315a (see entry 408 of the first MAC table 402a in FIG. 4). Similarly, the registry in the first MAC address table 402a represents a mapping of a MAC address MAC-SEC of the second router 312 to the third port 327 connecting the AIA device 318 with the second router 312 through the second broker device 315b (see entry 410 of the first MAC table 402a in FIG. 4). With respect to the second MAC address table 402b, the registry represents a mapping of a MAC address MAC-LAPT of the laptop 322 connected to the internal network 304 to the second 324 and fourth 326 ports that connect the AIA device 318 with the laptop 322 through the primary 306 and secondary 308 network, respectively (see entries 412 and 414 of the second MAC address table 402b in FIG. 4). In one embodiment, each MAC address table 402a, 402b supports approximately 24,000 (twenty-four thousand) addresses. It is noted that, in one embodiment, each entry in the MAC address table 402a, 402b may also include a timestamp indicating when an entry was last updated (for aging out entries from table that equal or exceed a predetermined age interval).

Referring back to FIG. 5, in step 506, the AIA device 318 searches the registry in the corresponding MAC address table 402a-402b for the source MAC address extracted in step 504. The AIA device 318 then determines whether the registry in the identified MAC address table 402a, 402b includes an entry matching with the extracted source MAC address (step 508). In response to finding the extracted MAC address in the MAC address table 402a, 402b (step 508, "Yes" branch), the AIA device 318 next determines, in step 510, whether the entry matching the extracted source MAC address is associated with the port matching the received ingress port information extracted from the packet header in step 504. The decisions of steps 508 and 510 represent AIA device's 318 determinations of whether the identified MAC address table 402 needs to be updated with regard to the source MAC address of the received packet.

In the absence of any entry matching both extracted MAC address (step 508, "No" branch) and the received ingress port information (step 510, "No" branch), the AIA device 318 performs step 512. In step 512, the AIA device 318 adds a new entry to the MAC address table 402 representing the relation between the source MAC address and the port information obtained from the received packet header.

In accordance with an embodiment of the present invention, the AIA device 318 may also maintain a status bit (most recently seen bit (MRSB)) 407 per entry in each MAC address table 402a, 402b to identify entries in the table which have been recently used, as shown in FIG. 4. In step 514, the AIA device 318 may clear (reset) the MRSB 407 in all MAC address table 407 entries matching only the extracted source MAC address. In step 516, the AIA device 318 sets the MRSB 407 of the entry that matches both the source MAC address and the corresponding port information extracted from the received packet's header. It is noted that such entry may include a new entry generated by the AIA device 318 in step 512. The status of MRSB 407 may be utilized by the AIA device 318 when the ingress packet becomes an egress packet returning from the inline tool 110.

Once the AIA device 318 completes the steps described above, in step 518, it forwards the ingress packet to one of the inline tools 110. It is noted that steps 504-516 are repeated by the AIA device 318 for each packet in the received ingress packet stream. Accordingly, in step 518, the AIA device 318 may aggregate a plurality of packets prior to sending them to one of the inline tools 110.

FIG. 6 is a flowchart illustrating exemplary steps for processing egress packets, in accordance with an embodiment of the present invention. In step 602, the AIA device 318 receives an egress packet stream from one of the inline tools 110. In step 604, the AIA device 318 processes the received egress packet stream by evaluating layer 2 header fields of all received packets. In step 604, the AIA device 318 extracts the source MAC address, destination MAC address and the received input port information from the egress packet header and searches the registry in the corresponding MAC address table 402a-402b for the extracted source MAC address. It is noted that egress packets should travel from the inline tools 110 back to the network they originated from.

According to an embodiment of the present invention, the AIA device 318 then determines whether the registry in the identified MAC address table 402a, 402b includes an entry matching the extracted source MAC address (step 606). In response to finding the extracted MAC address in the MAC address table 402a, 402b (step 606, "Yes" branch), the AIA device 318 next determines, in step 608, whether the entry matching the extracted source MAC address comprises the only matching entry in the MAC address table 402. In other words, in step 608, the AIA device 318 determines whether the extracted source MAC address is found only once. The decisions of steps 606 and 608 represent AIA device's 318 determinations of whether there is a L2 connection between inline networks of the communication system 300. In response to determining that the entry matching the extracted source MAC address is found only once (step 608, "Yes" branch), in step 620, the AIA device 318 gets the port number included in the matching entry in the MAC address table 402. The AIA device 318 designates this port as a destination port of the egress packet being processed.

In the absence of any entry matching the extracted source MAC address (step 606, "No" branch) or if the extracted source MAC address is found more than once (step 608, "No" branch), in step 610, the AIA device 318 then determines whether the extracted destination MAC address indicates that the packet being processed comprises a multicast packet. Generally, a multicast packet is directed to a group of the ports of the network. Multicast packets can be either link-layer multicast packets, such as MAC multicast packets, or IP multicast packets. It is noted that a multicast MAC destination address can map to more than one IP multicast group. In other words flooding multicast packets to multiple ports on an interconnected L2 network causes a packet storm. According to an embodiment of the present invention, once the AIA device 318 detects an L2 connection between the inline networks on a particular side there is no need to flood the packet. Instead, the AIA device 318 may merely send the packet to one arbitrary port. The selection of the port is not significant because L2 switching circuitry forwards the multicast packet to multiple destinations simultaneously. Thus, in response to finding a multicast packet (step 610, "Yes), the AIA device 318 simply sends the packet to any egress port.

If the extracted destination MAC address does not belong to a multicast packet (step 610, "No" branch), in step 612, the AIA device 318 searches the registry in the corresponding MAC address table 402 for the extracted destination MAC address. According to an embodiment of the present invention, the AIA device 318 then determines whether the registry in the identified MAC address table 402a, 402b includes an entry matching with the extracted destination MAC address (step 614). In response to not finding the extracted destination MAC address in the MAC address table 402a, 402b (step 614, "No" branch), the AIA device 318 simply transmits the packet being processed to the originating network (i.e., to a switch) without specifying a destination port. An L2 switch typically determines a destination port for each packet it receives based on learning MAC addresses of packets previously received by the switch.

In response to finding the entry matching the extracted destination MAC address in the MAC address table 402a, 402b (step 614, "Yes" branch), in step 616, the AIA device 318 gets the port number included in the matching entry in the MAC address table 402 with the MRSB bit set. In other words, if the AIA device 318 finds multiple entries corresponding to the destination MAC address, it selects an entry which is seen more recently. According to an embodiment of the present invention, in addition to maintaining MAC address tables 402 shown in FIG. 4, the AIA device may also maintain inline port mapping table, such as table 1 below:

TABLE 1

| Ingress port | Egress port |
| --- | --- |
| 1 | 2 |
| 2 | 1 |
| 3 | 4 |
| 4 | 3 |

According to an embodiment of the present invention, in step 618, the AIA device 318 preferably utilizes table 1 to determine what port to send the processed packet to when its forwarding decision is based on a destination MAC address lookup. Once the AIA device 318 determines a destination (egress) port from the corresponding inline port pair, it sends the packet back to the network that transmitted the corresponding ingress packet to the AIA device 318. For example, if the ingress packet was received from primary network 306 by first ports 325 of the AIA device 318, the AIA device 318 transmits the corresponding egress packet back to the primary network 306 via the second port 324.

In summary, according to various embodiments of the present invention, the AIA device 318 programmed to implement the enhanced MAC address learning function is capable of supporting multiple aggregated networks with L2 connections between them. Once the AIA device 318 detects such L2 connection, it changes its behavior to effectively operate as L2 switch and forward the packet to the correct network based on the destination MAC address extracted from the ingress packet.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for determining a routing for packets, the method comprising:
    coupling with one or more inline tool devices and a plurality of networks, two or more of the networks of the plurality of networks having a Layer 2 (L2) connection between the two or more networks of the plurality of networks, the L2 connection providing for communication between the two or more networks of the plurality of networks;
    processing an ingress packet received from an ingress inline network port to extract a source Media Access Control (MAC) address and a port identifier associated with the source MAC address;
    looking up the extracted source MAC address of the ingress packet in a MAC address table;
    forwarding the ingress packet to the one or more inline tool devices;
    processing an egress packet received from the one or more inline tool devices to extract at least one of a source MAC address and a destination MAC address;
    looking up the extracted source MAC address of the egress packet in the MAC address table;
    detecting whether there is an L2 connection based on finding the MAC source address in the MAC address table; and
    transmitting the egress packet to an egress inline network port, the egress inline network port being selected based on whether the L2 connection was detected and at least one of the looked up source MAC address and the extracted destination MAC address of the egress packet.

2. The method of claim 1, wherein the MAC address table comprises a memory array storing table entries, the table entries each comprising a MAC address selected from at least one of a source MAC address and a destination MAC address and a port identifier that identifies an ingress inline network port or egress inline network port associated with the MAC address.

3. The method of claim 1, wherein looking up the extracted source MAC address of the ingress packet in a MAC address table further comprises determining whether the extracted source MAC address of the ingress packet is found in the MAC address table and creating a new entry in response to determining that the extracted source MAC address of the ingress packet is not found in the MAC address table, wherein the new entry comprises the extracted source MAC address of the ingress packet and the extracted port identifier associated with the extracted source MAC address.

4. The method of claim 3, wherein determining whether the extracted source MAC address of the ingress packet is found in the MAC address table further comprises determining whether the extracted port identifier associated with the extracted source MAC address of the ingress packet matches a port identifier associated with the MAC address found in the MAC address table and creating a new entry in response to determining that the extracted port identifier does not match the port identifier associated with the MAC address found in the MAC address table, wherein the new entry comprises the extracted source MAC address of the ingress packet and the extracted port identifier associated with the extracted source MAC address of the ingress packet.

5. The method of claim 1, further comprising looking up the extracted destination MAC address of the egress packet in the MAC address table t.

6. The method of claim 5, wherein looking up the extracted source MAC address of the egress packet in the MAC address table further comprises:
    determining whether a single entry matching the extracted source MAC address of the egress packet is found in the MAC address table; and
    selecting the port identifier associated with the MAC address found in the MAC address table as the egress port for the egress packet, responsive to finding the single entry.

7. The method of claim 5, wherein looking up the extracted destination MAC address of the egress packet further comprises determining whether the extracted destination MAC address belongs to a multicast packet.

8. The method of claim 5, wherein looking up the extracted destination MAC address of the egress packet in the MAC address table further comprises:
    determining whether a single entry or multiple entries matching the extracted destination MAC address of the egress packet is found in the MAC address table;
    if so, selecting the single entry found or an entry of the multiple entries that was most recently used; and
    retrieving an egress port identifier from an inline port mapping table using information from the selected entry.

9. The method of claim 8, wherein the inline port mapping table contains a plurality of associations between ingress and egress inline network ports, wherein one of the egress inline network ports is connected to a destination network of the egress packet.

10. A system comprising:
    one or more inline tool devices configured to monitor and analyze a flow of network traffic;
    a plurality of networks, two or more of the networks of the plurality of networks having an Layer 2 (L2) connection between the two or more networks of the plurality of networks, the L2 connection providing for communication between the two or more networks of the plurality of networks; and
    an Advanced Inline Aggregation (AIA) device connected to each of the plurality of networks and connected to the one or more inline tool devices, the AIA device having stored therein a plurality of programming instructions, which when executed on the AIA device cause the AIA device to:
    process an ingress packet received from an ingress inline network port of the AIA device connected to one of the plurality of networks to extract a source Media Access Control (MAC) address and a port identifier associated with the source MAC address;

look up the extracted source MAC address of the ingress packet in a MAC address table;

forward the ingress packet to the one or more inline tool devices;

process an egress packet received from the one or more inline tool devices to extract at least one of a source MAC address and the destination MAC address;

look up the extracted source MAC address of the egress packet in the MAC address table detect whether there is an L2 connection based on finding the MAC source address in the MAC address table; and transmit the egress packet to an egress inline network port connected to the one of the plurality of networks, the egress inline network port being selected based on whether the L2 connection was detected and at least one of the looked up source MAC address and the extracted destination MAC address of the egress packet.

11. The system of claim 10, wherein the MAC address table comprises a memory array storing table entries, the table entries each comprising a MAC address selected from at least one of a source MAC address and a destination MAC address and a port identifier that identifies an ingress inline network port or egress inline network port associated with the MAC address.

12. The system of claim 10, wherein looking up the extracted source MAC address of the ingress packet in a MAC address table further comprises determining whether the extracted source MAC address of the ingress packet is found in the MAC address table and creating a new entry in response to determining that the extracted source MAC address of the ingress packet is not found in the MAC address table, wherein the new entry comprises the extracted source MAC address of the ingress packet and the extracted port identifier associated with the extracted source MAC address.

13. The system of claim 12, wherein determining whether the extracted source MAC address of the ingress packet is found in the MAC address table further comprises determining whether the extracted port identifier associated with the extracted source MAC address of the ingress packet matches a port identifier associated with the MAC address found in the MAC address table and creating a new entry in response to determining that the extracted port identifier does not match the port identifier associated with the MAC address found in the MAC address table, wherein the new entry comprises the extracted source MAC address of the ingress packet and the extracted port identifier associated with the extracted source MAC address of the ingress packet.

14. The system of claim 10, wherein the programming instructions, which when executed on the AIA device further cause the AIA device to look up the extracted destination MAC address of the egress packet in the MAC address table.

15. The system of claim 14, wherein looking up the extracted source MAC address of the egress packet in the MAC address table further comprises:

determining whether a single entry matching the extracted source MAC address of the egress packet is found in the MAC address table; and selecting the port identifier associated with the MAC address found in the MAC address table as the egress port for the egress packet, responsive to finding the single entry.

16. The system of claim 13, wherein looking up the extracted destination MAC address of the egress packet further comprises determining whether the extracted destination MAC address belongs to a multicast packet.

17. The system of claim 13, wherein looking up the extracted destination MAC address of the egress packet in the MAC address table further comprises:

determining whether a single entry or multiple entries matching the extracted destination MAC address of the egress packet is found in the MAC address table;

if so, selecting the single entry found or an entry of the multiple entries that was most recently used; and retrieving an egress port identifier from an inline port mapping table using information from the selected entry.

18. The system of claim 17, wherein the inline port mapping table contains a plurality of associations between ingress and egress inline network ports, wherein one of the egress inline network ports is connected to a destination network of the egress packet, the destination network comprising the one of the plurality of networks.

19. The system of claim 10, wherein the AIA device comprises a Field Programmable Gate Array (FPGA).

20. The system of claim 11, wherein the table entries exceeding a predetermined age interval are aged out from the MAC address table.

* * * * *